United States Patent
Michel (10) Patent No.: US 8,573,573 B2
(45) Date of Patent: Nov. 5, 2013

(54) SPRING STRUT ARRANGEMENT FOR WHEEL SUSPENSION OF MOTOR VEHICLES

(75) Inventor: Wilfried Michel, Riedenburg (DE)

(73) Assignee: Audi AG, Ingolstadt (DE)

( * ) Notice: Subject to any disclaimer, the term of this patent is extended or adjusted under 35 U.S.C. 154(b) by 633 days.

(21) Appl. No.: 12/808,005

(22) PCT Filed: Dec. 8, 2008

(86) PCT No.: PCT/EP2008/010384
§ 371 (c)(1),
(2), (4) Date: Aug. 24, 2010

(87) PCT Pub. No.: WO2009/077099
PCT Pub. Date: Jun. 25, 2009

(65) Prior Publication Data
US 2010/0308518 A1 Dec. 9, 2010

(30) Foreign Application Priority Data
Dec. 14, 2007 (DE) .......................... 10 2007 060 422

(51) Int. Cl.
*F16F 7/00* (2006.01)

(52) U.S. Cl.
USPC .......................................... 267/218; 267/225

(58) Field of Classification Search
USPC ................. 267/175, 177, 218, 221, 224, 225;
280/5.514, 6.157, 124.158, 124.145,
280/124.147, 124.154, 124.155
See application file for complete search history.

(56) References Cited

U.S. PATENT DOCUMENTS 4,830,395 A * 5/1989 Foley ..................... 280/124.162
6,676,119 B2 * 1/2004 Becker et al. ................. 267/218

(Continued)

FOREIGN PATENT DOCUMENTS

| EP | 1479542 | A2 | 11/2004 | |
| EP | 1681189 | A2 | 7/2006 | |
| EP | 2135756 | A1 * | 12/2009 | F16F 9/54 |
| JP | 2001080336 | A * | 3/2001 | B60G 17/02 |

OTHER PUBLICATIONS

Machine Translation of JP 2001-080336.*

*Primary Examiner* — Bradley King
*Assistant Examiner* — Nicholas J Lane
(74) *Attorney, Agent, or Firm* — Novak Druce Connolly Bove + Quigg LLP (57) ABSTRACT

The invention relates a spring strut arrangement for wheel suspensions of motor vehicles, which is formed from a telescoping shock absorber, a suspension spring element which is preferably made as a helical compression spring, and a preloaded spring element which is preferably made as a helical compression spring, the spring elements being supported by way of spring caps on the body of the motor vehicle and on a wheel suspension element and a third spring cap located in between being movably guided along the longitudinal axis of the shock absorber relative to the body by way of an electrically driven positioning drive which is located within the spring elements, the positioning drive having a positioning spindle which is pivoted around the shock absorber and an adjusting nut which is connected to the movable spring cap. According to the invention, the shock absorber with the shock absorber tube is located at the top on the body of the motor vehicle and the positioning spindle is pivoted on the shock absorber tube.

7 Claims, 5 Drawing Sheets

(56) References Cited

U.S. PATENT DOCUMENTS

| | | | |
|---|---|---|---|
| 7,135,794 B2* | 11/2006 | Kuhnel | 310/80 |
| 7,237,780 B2* | 7/2007 | Ohki | 280/6.157 |
| 7,469,910 B2* | 12/2008 | Munster et al. | 280/5.514 |
| 7,644,935 B2* | 1/2010 | Munster et al. | 280/5.514 |
| 7,784,800 B2* | 8/2010 | Michel | 280/5.514 |
| 7,967,117 B2* | 6/2011 | Abe | 188/299.1 |
| 8,205,864 B2* | 6/2012 | Michel | 267/218 |
| 2004/0036206 A1* | 2/2004 | Loser et al. | 267/218 |

\* cited by examiner

SPRING STRUT ARRANGEMENT FOR WHEEL SUSPENSION OF MOTOR VEHICLES

The invention relates to a spring strut arrangement for wheel suspensions of motor vehicles.

BACKGROUND OF THE INVENTION

Various hydraulic, hydraulic/pneumatic, and fully electrical systems with all-electrical actuators are known for active vertical adjustment of a motor vehicle. An active "spring strut" that is suitable for this vertical adjustment has a suspension spring and a preloaded spring which are each separated by an adjustable spring cap. The adjustable spring cap is exposed to positioning forces during vertical adjustment. That is, the adjustable spring cap as needed traverses an axial path dictated by the control, and thus ultimately produces a positioning force on the wheel. The lifting motion of the adjustable spring cap takes place almost exclusively by a ball groove thread drive in which the adjustable spring cap does not rotate during its lifting motion, but remains torsionally strong, while the relatively slender spindle of the ball groove thread drive rotates and is driven by an electric motor which is located in the spring strut itself.

This type of wheel suspension is described by DE 10 2005 001 744 B3 in which there is a preloaded spring located concentrically on the spring strut above the suspension spring; this preloaded spring opposes the spring force of the support spring and thus reduces the adjusting forces which must be applied by an electromechanical actuator or a positioning drive in order to effect adjustment of the level and/or pitching and rolling equalization on the motor vehicle by way of the axially adjustable spring cap. The three-dimensional and functionally reliable arrangement of the positioning drive integrated on the spring strut within the preloaded spring is a problem, however, especially for wheel suspensions with steered wheels in which the wheel requires a corresponding free space in the wheel well and for the wheel suspension elements.

The spindle shown in DE 10 2005 001 744 B3 does have a large bearing base. Valuable installation space is lost, however, by lining up the elongated bearing bush with its lower bearing arrangement. This has an adverse effect on the shock absorber length and on the shock absorber stroke. Moreover, the total weight of the spring strut is increased by the long piston rod which is required in this design and the long bearing bush. The shock absorber plunges into the lower part of the spindle and is cardanically deflected relative to the spindle when driving. This can lead to contact between the oscillating shock absorber and the rotating spindle. This contact between the shock absorber and spindle is further promoted by the piston rod which is elastically supported in its upper end. In order to prevent this contact between the shock absorber and spindle, the radial air gap between the shock absorber and spindle would have to be dimensioned to be correspondingly large. This would, however, lead to a relatively large spindle diameter, as a result of which, however, the rotational mass moment of inertia of the spindle is adversely increased.

The object of the invention is to propose a spring strut arrangement of the generic type which ensures a structurally especially compact and functionally reliable construction.

SUMMARY OF THE INVENTION

According to the invention, it is proposed that the shock absorber with the absorber tube be located toward the top on the vehicle body and that the positioning spindle of the positioning drive be pivoted on the absorber tube. This yields a structurally especially durable and compact construction of the integrated positioning drive with reduced cost of parts, since the guide sleeve required in the generic design for the positioning spindle can be omitted without replacement. Furthermore, in this way the positioning drive can be made with a smaller outside diameter; this improves the installation situation of the entire spring strut with the suspension spring and preloaded spring in the motor vehicle.

Thus, according to the invention, a spindle bearing arrangement for an active spring strut is made available which is located on the stationary outer tube of an upside-down single-tube shock absorber. Therefore, a higher-performance dual-tube shock absorber is preferably unnecessary, since the structure is cushioned by the actuators themselves. Consequently, the absorber need only perform the dampening work for the unsprung masses. Thus, only wheel dampening is undertaken by the shock absorber. This is beneficial with respect to the radial dimensional chain.

A single-tube shock absorber is dimensioned with a smaller diameter compared to a dual-tube shock absorber. This also means a smaller diameter of the spindle, as a result of which the rotational mass moment of inertia of the spindle is smaller. Thus, the output of the spindle drive motor can also be reduced. The preloaded spring, which is disposed concentrically around the spindle, can likewise be made smaller in diameter.

Accordingly, the bellows located around the preloaded spring can be reduced in its radial extension. Overall this yields a smaller weight of the spring strut with simultaneously reduced installation space.

The positioning spindle can be supported on the shock absorber tube in the region of the spindle's front ends without adversely affecting the shock absorber stroke with a large bearing distance and thus can form a structure of the positioning drive which is especially impervious to bending forces and moments. The very long bearing base for the positioning spindle therefore reduces the reaction forces in the bearing arrangement accordingly; as a result, antifriction bearings of favorable weight and smaller dimensions can be used.

Furthermore, the bearing arrangement of the positioning spindle can be produced by way of two antifriction bearings, of which the body-side antifriction bearing is an axially and radially guiding bearing and the second antifriction bearing is an only radially guiding needle bearing. This enables a construction which is easy to mount and simple in terms of structure and production engineering and which, moreover, constitutes a very smoothly running bearing arrangement of the positioning spindle.

In addition, the shock absorber cylinder can be advantageously coupled to the body by way of a journal-shaped extension and a body-side, rubber-elastic shock absorber bearing, with the body-side antifriction bearing of the positioning spindle being located on the extension in a manner which favors installation space and mounting. Thus, according to the invention, the shock absorber can be permanently joined to the motor housing and, in contrast to the prior art, is stationary relative to the positioning spindle. Therefore, a conventional radial bearing arrangement with fixed and movable bearings is sufficient, i.e., without axial guidance.

Due to the resulting reduced radial extension of the dimensional chain shock absorber—spindle—preloaded spring—bellows, an extremely space-saving configuration of the active spring strut arises. In contrast to the prior art, therefore, according to the invention, a shock absorber which is oscillating does not plunge into the rotating positioning spindle during driving. The danger of contact between the two components is thus precluded. According to the invention, the shock absorber and positioning spindle or its spindle bearing arrangement cannot be lined up in a row next to one another in the axial direction, but rather can be interested in one another. Accordingly, in contrast to the prior art, no elongated bearing bush with a lower spindle bearing arrangement is necessary which would be in the way of the shock absorber stroke. In this way a piston rod with reduced length and less weight can be designed. Furthermore, an elongated bearing base is produced for the shock absorber-piston rod system; this in turn means small support forces in the piston and rod guide. The shock absorber thus works with reduced friction in the guides, thus enhancing driving comfort.

The positioning spindle on its outer periphery can bear the rotor of the electric motor of the positioning drive, while the stator which is located around the rotor is positioned within a cup-shaped bearing housing which, with the body-side spring cap and the bearing core of the shock absorber bearing, forms an easy-to-install unit.

In one advantageous development of the invention, the positioning spindle of the positioning drive can have at least one annular, elastic stop for limiting the stroke of the adjusting nut. Such end stops prevent overloads in the positioning drive or possible damage in the event of extraordinary operating situations or faults.

The upper end stop can be fixed on the motor housing which does not turn and against which the adjustable spring cap, which likewise does not turn, can strike. Since there is no relative motion in the direction of rotation between the adjustable spring cap and the upper end stop, but the adjustable spring cap moves linearly in the direction of the upper end stop, the upper end stop can be a simple elastomer ring which dampens a faulty lifting motion of the adjustable spring cap toward the top and neutralizes it.

The situation is completely different on the lower end stop. Here, if the control were operating properly, there would not be any contact between the adjustable spring cap and the positioning spindle. To limit the motion of the adjustable spring cap in the event of faulty control, there is, however, a lower end stop to mechanically brake the adjustable spring cap. In contrast to the upper end stop, however, the positioning spindle turns relative to the adjustable spring cap which does not turn. For the case in which the lower end stop—like the upper end stop—were to be made as a simple elastomer ring, the adjustable spring cap would, however, without fail stick on the elastomer ring, since here the energy supplied from the mass moments of inertia of the positioning spindle, which are to be braked, is many times larger than the driving torque of the electric motor. The electric motor would therefore be unable to release the spindle drive again, once it had become stuck.

Therefore, according to the invention, the lower end stop between the rotating positioning spindle and the torsionally strong adjusting nut and adjustable spring cap can be a torsion spring which has one or more turns and which produces a reset force.

Here, there can be a stop between the rotating positioning spindle and the torsionally strong adjusting nut and there can be a torsion spring which has one or more turns and which produces a reset force. The reset force of the torsion spring makes it possible to avoid friction-induced sticking between the turning positioning spindle and the adjusting nut of the positioning drive, which nut does not turn, in the striking region.

In particular, the torsion spring with a molded-on catch hook can engage a stop pin in the stop region between the positioning spindle and the adjusting nut and thus can act increasingly as a rotary stop by compressing the torsion spring.

To keep the mass moment of inertia of the rotating positioning spindle as small as possible, it is advisable to allow the low-mass stop pin to rotate along with the positioning spindle. The torsion-spring stop is attached in the region of the adjusting nut, i.e., on its lower end. Thus, the torsion spring, which necessarily has more mass than the stop pin, does not take part in rotation, but only in the oscillation of the adjustable spring cap. In a positioning and lifting motion of the adjustable spring cap in the direction of the lower end stop, the stop pin initially will not yet touch the catch hook of the torsion spring, but does so only during the last rotation before reaching the end stop. The energy of rotation of the positioning spindle is then converted into spring work. In this way friction-damped oscillation can set in. Conversely, when current is present, the torsion spring is wound by the angle that corresponds to the motor torque and the spring characteristic. In the de-energized state the positioning spindle is transferred into the torque-free state, i.e., the torsion spring sets the positioning spindle back into the position in which it is relieved. Sticking of the spindle drive is thus precluded since the contact surfaces of the stop pin and of the torsion spring stop touch only in the normal direction. The torsion spring stop moreover has the advantage that in contrast to an elastomer ring, it does not have a progressive characteristic, but rather a linear one. Moreover, the torsion spring stop can be made much softer than an elastomer ring.

Here the torsion spring can preferably be anchored without the capacity to turn on the adjusting nut of the positioning drive which bears the adjustable spring cap, while the stop pin which interacts with the catch hook is attached on the positioning spindle on its end region. The torsion spring is accordingly axially shifted with the adjusting nut when the positioning drive has been activated, while the positioning spindle bears only the stop pin which follows a circular path and thus has a low mass moment of inertia, which is favorable for the positioning speed and response behavior of the positioning drive.

Furthermore, there can also be an annular, elastic stop for the adjusting nut between the adjustable spring cap and the cup-shaped bearing housing of the stator of the electric motor.

The positioning drive can be, for example, a screw drive with a threaded spindle and a threaded nut. It is preferably suggested, however, that the positioning drive be, in the conventional manner, a ball groove spindle drive with a positioning spindle, a ball nut, and the balls located in between.

The proposed combination of the shock absorber arrangement (shock absorber tube at top) and of the integrated positioning drive advantageously enables the use of a simple single-tube shock absorber, for example a single-tube gas pressure shock absorber, since the body of the motor vehicle can be at least partially steadied by way of the positioning drive and essentially only cushioning work needs to be performed for the unsprung masses. This is associated with a reduction of weight and a more compact construction of the spring strut arrangement compared to use of a dual-tube shock absorber.

DETAILED DESCRIPTION OF THE PREFERRED EMBODIMENTS OF THE INVENTION

Figure 1:
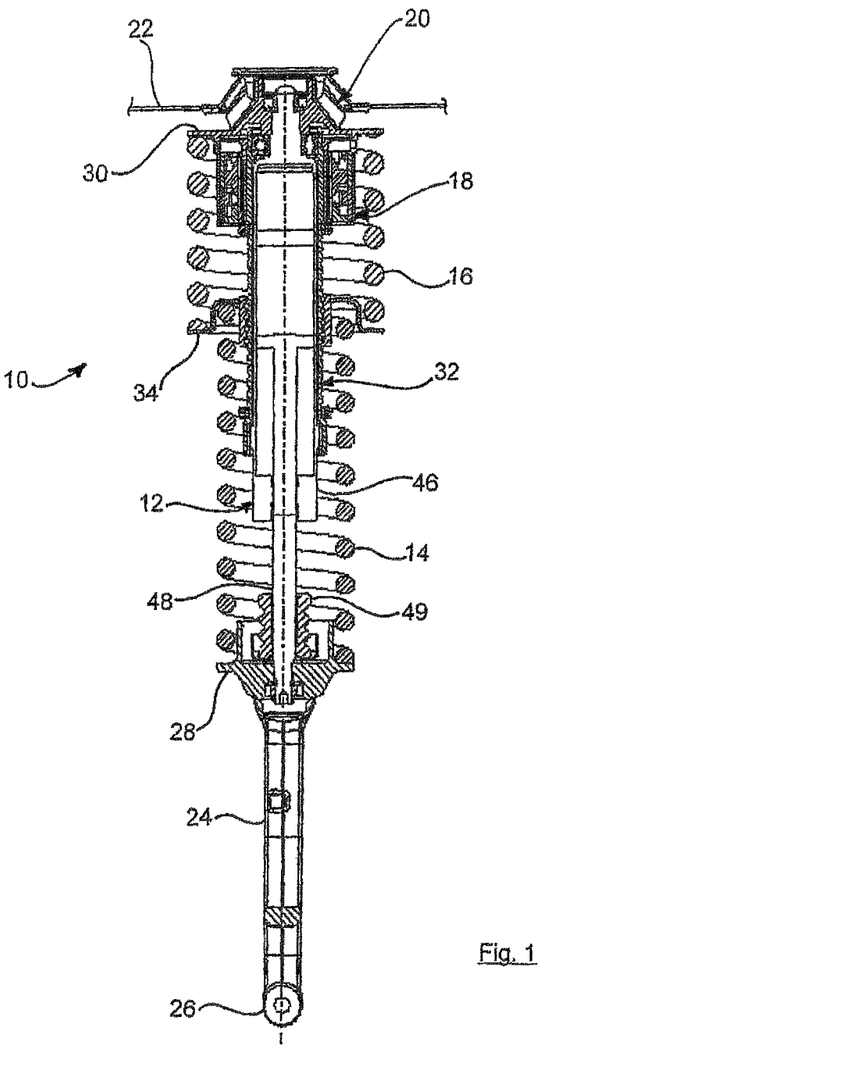
FIG. 1 shows a longitudinal section through a spring strut for the wheel suspension of a motor vehicle, with a telescoping shock absorber, a suspension spring, a preloaded spring, and an electrical actuator with a ball groove spindle-positioning drive.

The spring strut 10 as shown in FIG. 1 has essentially a telescoping shock absorber 12, a suspension spring 14, a preloaded spring 16, and an electromechanical actuator 18.

The spring strut 10 on its upper end is coupled to the body 22 (only suggested) of the motor vehicle by way of an annular, rubber-elastic shock absorber bearing 20. The lower end of the spring strut 10 is articulated by way of a support brace 24 and a rubber-metal sleeve joint 26 to a wheel suspension element, for example a connecting rod or a wheel carrier.

The suspension spring 14 and the preloaded spring 16 are made as helical compression springs, as is apparent, and are supported on the support brace 24 and on the body 22 by way of spring caps 28, 30. Between the suspension spring 14 and the preloaded spring 16, there is an adjustable spring cap 34 which can be moved axially by way of a positioning drive 32 and on which the suspension spring 14 and the preloaded spring 16 are supported, connected in succession.

Thus, the body 22 of the motor vehicle can be raised or lowered for adjusting the level and/or for pitch and rolling stabilization by axially moving the adjustable spring cap 34 by way of the positioning drive 32.

The positioning drive 32 is a ball groove spindle drive with a radially inner, sleeve-shaped positioning spindle 36 (cf. FIG. 2) and a ball nut 40 which can be axially adjusted by way of balls 38 located in between. The ball nut 40 is permanently connected to the spring cap 34 and is held without the capacity to turn by way of the support force of the two springs 14, 16.

Figure 2:
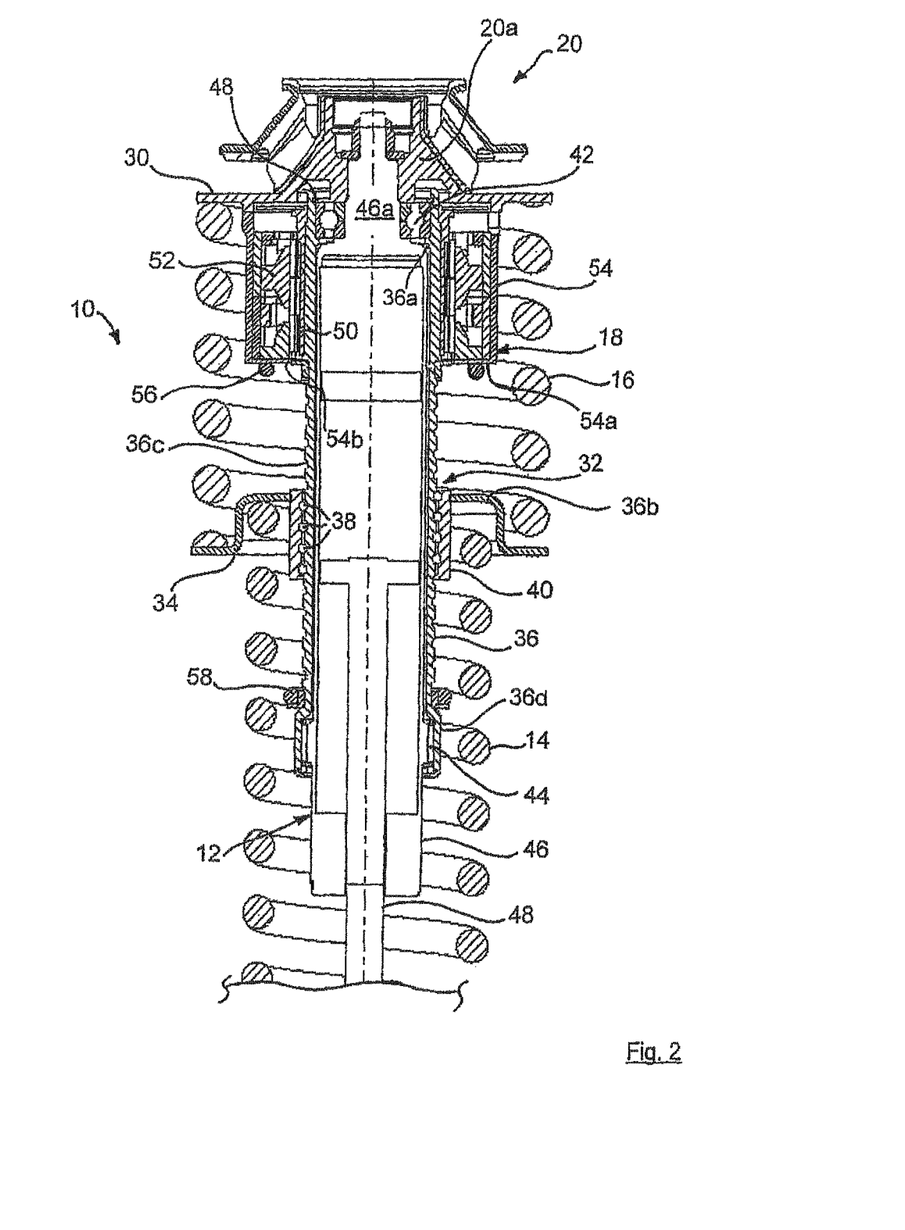
FIG. 2 shows a partial view of the spring strut as shown in FIG. 1, enlarged.

The positioning spindle 36 on its two front ends is pivoted by way of antifriction bearings 42, 44 on the shock absorber tube 46 of a design which is known as a single-tube gas pressure shock absorber 12, whose downward projecting piston rod 48 is permanently connected to the support brace 24 (FIG. 1) and the spring cap 28. On the piston rod 48 there is moreover a rubber-elastic stop buffer 49 which is used as a stop and as an extra spring within the spring strut 10 in interaction with the shock absorber tube 46 of the shock absorber 12.

The upper antifriction bearing is an axially and radially guiding four-point bearing 42 whose inner bearing ring is mounted on a journal-shaped extension 46a of the shock absorber tube 46 and is clamped between the shock absorber tube 46 and the metal bearing core 20a of the shock absorber bearing 20, while the outer bearing ring is axially fixed between the inner ring shoulder 36a and the snap ring 48 on the positioning spindle 36.

The lower antifriction bearing of the positioning spindle 36 is an only radially guiding needle bearing 44, which is located directly on the shock absorber tube 46 and within the positioning spindle 36.

The positioning spindle 36 on its outer periphery bears a rotor 50 which, with an annular stator 52, forms the electric motor drive of the positioning spindle 36 in both directions of rotation. The stator 52 with the corresponding electrical windings is located in a cup-shaped bearing housing 54 through whose bottom 54a the positioning spindle 36 is routed to the exterior by way of a bore 54b. On the bottom 54a of the bearing housing 54, there is an annular rubber-elastic stop 56 against which the adjustable spring cap 34 with its ring shoulder 36b can run.

Furthermore, the bearing housing 54, as is apparent from FIG. 2, forms a unit with the upper spring cap 30 and the bearing core 20a of the shock absorber bearing 20.

On the ends of the screw-shaped ball paths 36c which are machined into the positioning spindle 36 in the region of the needle bearing 44, there is another annular, rubber-elastic stop 58 on which the ball nut 40 can run to limit the maximum possible adjustment stroke of the movable spring cup 34. The corresponding spring washers are axially supported by way of the bottom 54a and the ring shoulder 36b, on the one hand and by way of the section 36d of the positioning spindle 36 which has been enlarged in outside diameter, on the other.

Figure 3:
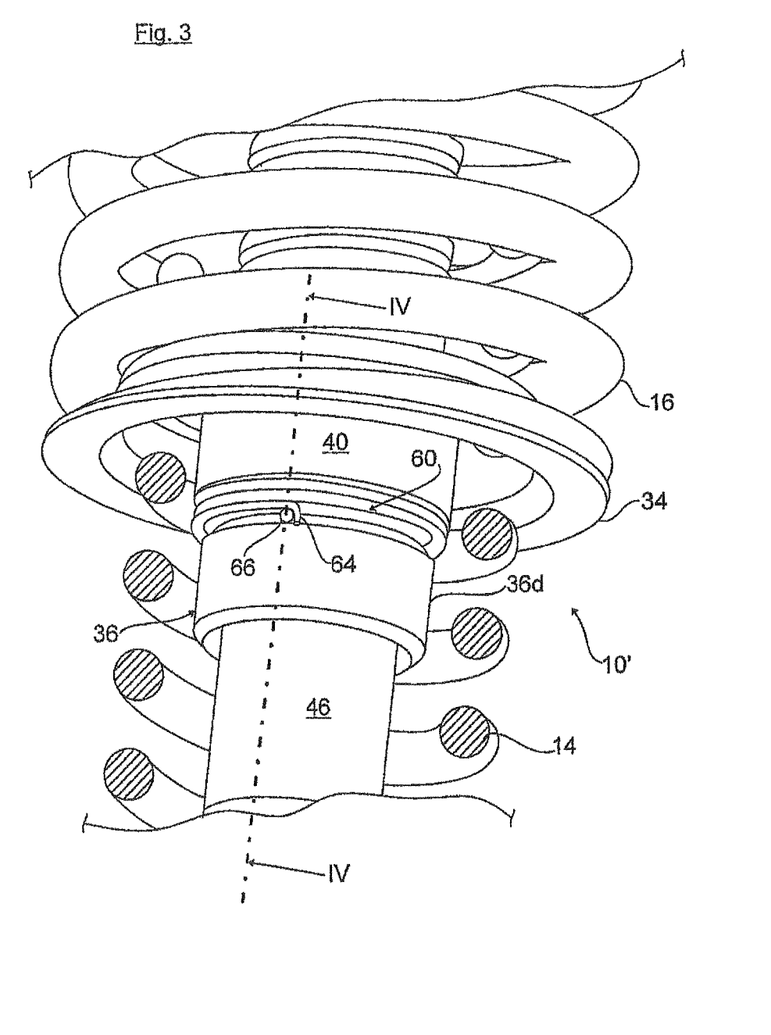
FIG. 3 shows a perspective view of a spring strut which corresponds to the spring strut as shown in FIGS. 1 and 2, but with a torsion spring as the stop between the positioning spindle and the adjusting nut of the positioning drive in the case of faulty control of the adjustable spring cap.
Figure 4:
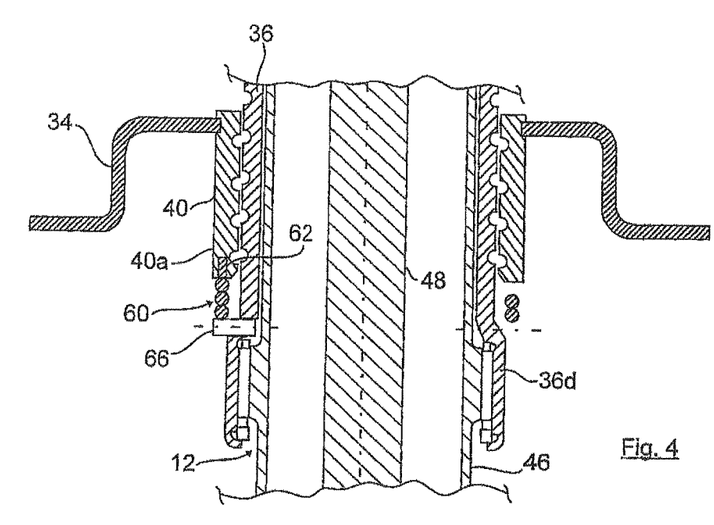
FIG. 4 shows a section along line IV-IV of FIG. 3 through the stop with the torsion spring.
Figure 6:
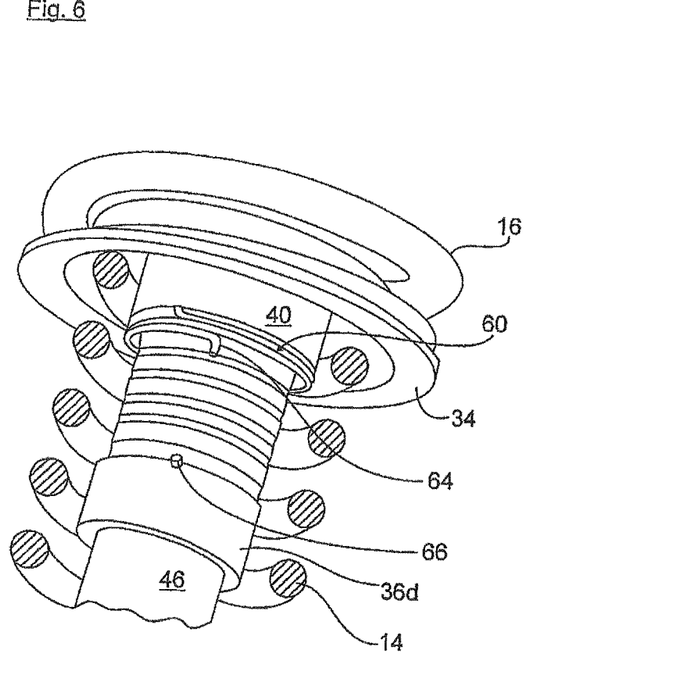
FIG. 6 shows a perspective view of the spring strut in the case of proper control of the adjustable spring cap.

FIGS. 3, 4 and 6 show a spring strut 10' in which the lower stop between the positioning sleeve 36 and the ball nut 40 with the spring cup 34 is made with a torsion spring 60 which produces a reset force.

For this purpose the torsion spring 60 (cf. FIGS. 3 to 6) on the ends of its turns which run over the periphery of the positioning spindle 36 on the one hand has an axially projecting locking leg 62 and, on the other, a likewise axially projecting catch hook 64.

The torsion spring 60 is held securely in a front bore 40a of the ball nut 40 by way of the locking leg 62 (cf. FIG. 4) and is thus accordingly shifted at the same time when the ball nut 40 is axially displaced.

Furthermore, a radially projecting stop pin 66 is permanently inserted into the positioning spindle 36 at the transition into the section 36d and accordingly describes a circular path when the positioning spindle 36 rotates.

FIG. 6 shows the state of the spring strut when there is proper control of the adjustable spring cap 34. Accordingly, the adjustable spring cap 34 is not in contact either with the upper or the lower stop. It is only in the case of faulty control of the adjustable spring cap 34 that it can come into contact with the lower stop pin 66.

When this axial adjustment of the ball nut 40 with the torsion spring 60 into the region of the stop pin 66 occurs, the catch hook 64 of the torsion spring 60 is dynamically connected to the stop pin 66 (cf. FIG. 3) such that the torsion spring 60 is contracted by turning the positioning spindle 36 and in doing so produces an increasing reset force until there is rotary blocking of the positioning spindle 36. It goes without saying that the winding of the torsion spring 60 must be aligned accordingly.

Due to the reset force of the torsion spring 60 which has been applied in the stop position, the positioning spindle 36 can be released again relative to the ball nut 40 which is held unable to turn without a larger torque to be applied by way of the electric motor 50, 52.

Figure 5:
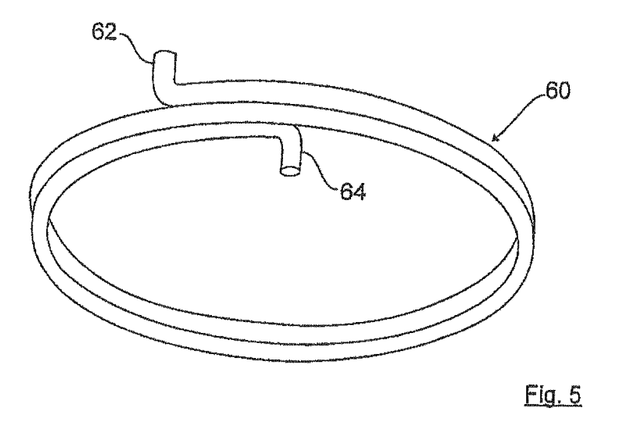
FIG. 5 shows the torsion spring as shown in FIGS. 3 and 4 in a perspective representation.

The torsion spring 60 can have a round profile or optionally also a rectangular profile in cross section, as shown. Instead of multiple turns, there can also be only one turn.

The invention claimed is:

1. A strut connectable between a wheel suspension component and the body of a motor vehicle, comprising:

a shock absorber including a cylindrical member closed at one end connectable to said vehicle body, and a piston with a rod extending through an opening in the other end thereof, connectable to said suspension component;

a first cylindrical sleeve member coaxially mounted on said cylindrical member, selectively rotatable by a motor mountable on said vehicle body;

a second cylindrical sleeve member coaxially mounted on said first cylindrical sleeve member provided with a ball and screw connection therebetween, and an annular flange rigidly mounted coaxially therein;

a first helical spring disposed coaxially relative to said shock absorber, having one end engaging said annular flange of said second cylindrical sleeve and an opposite end connectable to said suspension component;

a second helical spring disposed coaxially relative to said shock absorber, having one end engaging said annular flange of said second cylindrical sleeve and an opposite end connectable to said vehicle body; and a third torsion spring disposed coaxially relative to said shock absorber, having an end connected to said second cylindrical sleeve member and an opposite end engageable by an abutment surface of said first cylindrical sleeve member upon axial displacement of said second cylindrical sleeve member toward an end of said first cylindrical sleeve member, effecting compression of said third torsion spring.

2. The strut according to claim 1 wherein said one end of said third torsion spring is disposed substantially parallel to the axis of said shock absorber and is received in an opening in said second cylindrical sleeve member, and said other end of said third torsion spring is disposed substantially parallel to said axis.

3. The strut according to claim 2 wherein said abutment surface of said first cylindrical sleeve member comprises a component of said first cylindrical sleeve member, projecting radially relative to said axis.

4. The strut according to claim 3 wherein said component comprises a pin.

5. The strut according to claim 1 including cushioning means disposed on said first cylindrical sleeve member engageable by said second cylindrical sleeve member.

6. The strut according to claim 1 including a bearing disposed between said cylindrical member of said shock absorber and said first cylindrical sleeve member.

7. The strut according to claim 1 wherein said motor includes a stator supportable on said vehicle body and a rotor mounted on said first cylindrical sleeve member.

* * * * *